(12) United States Patent
Pastoors et al.

(10) Patent No.: US 9,889,781 B2
(45) Date of Patent: Feb. 13, 2018

(54) VEHICLE SEAT, IN PARTICULAR MOTOR VEHICLE SEAT

(71) Applicant: JOHNSON CONTROLS GMBH, Burscheid (DE)

(72) Inventors: Alfred Pastoors, Cologne (DE); Stefan Wetzig, Ennepetal (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 118 days.

(21) Appl. No.: 15/028,197

(22) PCT Filed: Oct. 8, 2014

(86) PCT No.: PCT/EP2014/071542
§ 371 (c)(1),
(2) Date: Apr. 8, 2016

(87) PCT Pub. No.: WO2015/055478
PCT Pub. Date: Apr. 23, 2015

(65) Prior Publication Data
US 2016/0243966 A1 Aug. 25, 2016

(30) Foreign Application Priority Data
Oct. 14, 2013 (DE) .................. 10 2013 220 659

(51) Int. Cl.
*B60N 2/68* (2006.01)
*B60N 2/22* (2006.01)

(52) U.S. Cl.
CPC ............. *B60N 2/682* (2013.01); *B60N 2/22* (2013.01)

(58) Field of Classification Search
None
See application file for complete search history.

(56) References Cited

U.S. PATENT DOCUMENTS 6,328,381 B1 * 12/2001 Smuk ................. B60N 2/20
297/365
6,739,668 B2 * 5/2004 Coman ................ B60N 2/206
297/378.12

(Continued)

FOREIGN PATENT DOCUMENTS

DE 20 2009 015 235 U1 3/2010
DE 10 2008 063 359 A1 7/2010

(Continued)

*Primary Examiner* — David E Allred
(74) *Attorney, Agent, or Firm* — McGlew and Tuttle, P.C.

(57) ABSTRACT

A vehicle seat (1) includes a seat part (3), a backrest (2) a fitting (10) including a first fitting part (11) rotatable relative to a second fitting part (12) about an axis (A) and relative to the seat part that is pivotable about the axis (A). A first adapter (20) fixedly connects the first fitting part to a structure of the backrest or seat part. A second adapter (50) fixedly connects the second fitting part with the other of the structure of the seat part or backrest. A first stop (25) on the first adapter (20) and a second stop (60), integrally formed with the second adapter (50) and surfaces from an edge transition of the second adapter (50), interact to limit a pivot angle of the backrest. The second stop (60) comprises a limb (61), extending from the edge transition (54), in a radial direction, toward the axis (A).

14 Claims, 4 Drawing Sheets

(56) References Cited

U.S. PATENT DOCUMENTS

| | | | | |
|---|---|---|---|---|
| 6,749,262 | B2* | 6/2004 | Schaffner | A61G 5/043 16/360 |
| 9,022,479 | B2* | 5/2015 | Hellrung | B60N 2/22 297/378.13 |
| 9,108,541 | B2* | 8/2015 | Assmann | B60N 2/20 |
| 9,487,113 | B2* | 11/2016 | Schukalski | B60N 2/06 |
| 9,522,616 | B2* | 12/2016 | Kaneda | B60N 2/3013 |
| 9,731,632 | B2* | 8/2017 | Kajale | B60N 2/206 |
| 9,758,065 | B2* | 9/2017 | Kimura | B60N 2/22 |
| 2011/0101755 | A1 | 5/2011 | Assmann | |
| 2016/0339809 | A1* | 11/2016 | Wetzig | B60N 2/20 |

FOREIGN PATENT DOCUMENTS

| | | |
|---|---|---|
| DE | 10 2009 041 491 A1 | 3/2011 |
| DE | 10 2010 035 377 A1 | 2/2012 |
| DE | 10 2011 012 076 A1 | 8/2012 |
| DE | 10 2012 009 159 A1 | 11/2012 |
| DE | 11 2010 004 681 T5 | 2/2013 |
| EP | 0 068 960 A1 | 1/1983 |
| EP | 1 859 706 A1 | 11/2007 |
| WO | 2012/072216 A1 | 6/2012 |
| WO | 2012/123084 A1 | 9/2012 |

\* cited by examiner

VEHICLE SEAT, IN PARTICULAR MOTOR VEHICLE SEAT

CROSS REFERENCE TO RELATED APPLICATIONS

This application is a United States National Phase Application of International Application PCT/EP2014/071542 filed Oct. 8, 2014 and claims the benefit of priority under 35 U.S.C. § 119 of German Patent Application 10 2013 220 659.3 filed Oct. 14, 2013, the entire contents of which are incorporated herein by reference.

FIELD OF THE INVENTION

The invention relates to a vehicle seat, in particular a motor vehicle seat, having a seat part and a backrest which is connected to the seat part by means of at least one fitting which comprises a first fitting part and a second fitting part that is rotatable about an axis relative to the first fitting part, said backrest also being pivotable about the axis relative to said seat part, a first adapter which connects the first fitting part firmly to a structure of the backrest or to a structure of the seat part, a second adapter which connects the second fitting part firmly to the other of the two structures of the seat part and of the backrest, wherein provision is made of at least one first stop on the first adapter and at least one second stop on the second adapter, and the first stop limits the pivot angle of the backrest by interacting with the second stop with the fitting unlocked, and the second stop is formed in one piece with the second adapter, and the second stop protrudes from a peripheral lip of the second adapter.

BACKGROUND OF THE INVENTION

In the case of a vehicle seat known from EP 1 859 706 A1, a stop is welded onto each of the seat part and the backrest. When the backrest is pivoted toward the rear, the two stops come into contact with one another, limit the pivot angle and as a result support the backrest toward the rear.

DE 20 2009 015 235 U1 discloses a vehicle seat having a backrest that is pivotable relative to a seat part. A stop assigned to the seat part interacts in each pivoting position with in each case one of two stops that are assigned to the backrest, and as a result limits the pivot angle of the backrest. The stop assigned to the seat part protrudes from an adapter. The adapter comprises a main body that extends largely perpendicularly to the pivot axis of the backrest, the stop protruding from said main body in the axial direction.

DE 11 2010 004 681 T5 discloses a fitting for a vehicle seat, said fitting comprising a first fitting part and a second fitting part that is rotatable about a pivot axis relative to the first fitting part. The first fitting part is connected to a first adapter and the second fitting part is connected to a second adapter. The second adapter has a peripheral lip which extends about the pivot axis in a curved manner in places and is interrupted by a cutout to form two portions. An end face, extending parallel to the pivot axis, of one portion of the peripheral lip serves as a stop for a pin connected indirectly to the first fitting part. The width of the stop surface corresponds to the material thickness of the second adapter. The size of the stop surface is limited by the material thickness.

DE 10 2012 009 159 A1 discloses a fitting arrangement for a vehicle seat, said fitting arrangement comprising three fitting parts. A second fitting part has a peripheral lip, from the end of which a stop, which serves as a control element for a locking device, is angled toward the outside.

DE 10 2008 063 359 A1 discloses a fitting for a vehicle seat which has a backrest and a seat part, having a first fitting part secured to the seat part, a second fitting part, which is rotatable between a plurality of use positions relative to the first fitting part in order to adjust the inclination of the backrest of the vehicle seat, and a third fitting part secured to the backrest, said third fitting part being lockable with a latching element firmly connected to the second fitting part and being pivotable about an axis relative to the second fitting part in order to freely pivot the backrest, wherein the pivoting movement of the third fitting part from the use position into the freely pivoted position is limited by a limit stop. The limit stop protrudes from the adapter in a manner parallel to the axis. The width of the stop surface corresponds to the material thickness of the second stop. The size of the stop surface is limited by the material thickness of the stop.

WO 2012/123084 A1 discloses an adjusting means for a vehicle seat having a seat part and a backrest for adjusting the inclination angle of the backrest relative to the seat part. The adjusting means has a seat part fitting which is connected to the seat part and a backrest fitting which is connected to the backrest. The fittings comprise stops which limit the adjusting range of the backrest relative to the seat part, wherein the adjusting range is intended to be settable. To this end, the stops are screwed onto the fitting.

SUMMARY OF THE INVENTION

The invention is based on the problem of improving a vehicle seat of the type mentioned at the beginning, in particular of increasing the strength of the stops in order that the latter cannot be deformed by forces associated with misuse. In particular, a contact region in which the stop surfaces are able to touch is intended to be enlarged.

This problem is solved according to the invention by a vehicle seat, in particular a motor vehicle seat, having a seat part and a backrest which is connected to the seat part by means of at least one fitting which comprises a first fitting part and a second fitting part that is rotatable about an axis relative to the first fitting part, said backrest also being pivotable about the axis relative to the seat part, a first adapter which connects the first fitting part firmly to a structure of the backrest or to a structure of the seat part, a second adapter which connects the second fitting part firmly to the other of the two structures of the seat part and of the backrest, at least one first stop on the first adapter and at least one second stop on the second adapter, wherein the first stop limits the pivot angle of the backrest by interacting with the second stop. The second stop is formed in one piece with the second adapter and protrudes from a peripheral lip of the second adapter, wherein the second stop is a leg which extends in a manner oriented toward the axis in the radial direction starting from the peripheral lip or has a first leg which extends in a manner oriented toward the axis in the radial direction starting from the peripheral lip and a second leg.

Since the second stop is a leg which extends in a manner oriented toward the axis in the radial direction starting from the peripheral lip or has a first leg which extends in a manner oriented toward the axis in the radial direction starting from the peripheral lip and a second leg, the second stop is formed in a very flexurally rigid zone of the adapter. Compared with an arrangement of the second stop within the main body of the adapter, the material surrounding the second stop tends to bulge less in the region of the peripheral lip. Thus, greater impact forces can be absorbed by the second stop without plastic deformation of the second adapter occurring. In addition, a contact region in which stop surfaces of the first and the second stop can touch is not limited by the sheet metal thickness of the second stop.

The peripheral lip represents an essential control variable for designing the rigidity of the entire seat structure. The rigidity of the entire seat structure can be influenced by the second stop, and so the second stop itself is an effective control variable for the force management of the seat structure.

As a result of the integration, according to the invention, of the second stop into the peripheral lip, a cost-lowering functional integration is achieved, this also serving as a measure for selectively influencing the structural rigidity, for example in that energy can be absorbed selectively by local deformation in the region of the second stop in the event of a crash.

The first adapter is advantageously constructed in a geometrically simple manner and as a result designed to be inexpensive. To this end, the first adapter comprises a first main body extending largely perpendicularly to the pivot axis of the backrest, the first stop protruding from said first main body in the axial direction. For further functional integration, it is advantageous for the first stop to be formed integrally with the first adapter, in particular to be bent or folded at right angles in the axial direction.

A preferred embodiment of the first adapter provides for the latter to be produced from a sheet metal material and to have a first stop surface for interacting with a second stop surface of the second stop. The first stop surface can be formed from a cut surface of the sheet metal material. Like any component produced from a sheet metal material, an adapter produced from sheet metal, for example sheet steel, also comprises a planar body with a thickness predetermined by the sheet metal thickness, said thickness being low compared to the other dimensions of the adapter. Along the outer contours and the inner contours produced by openings there extend cut faces which are oriented preferably perpendicularly to the sheet metal surface and have in this direction a depth which is largely predetermined by the sheet metal thickness. A cut surface should thus be understood as meaning those component surfaces which are produced by separating the sheet metal during the production process. All material-removing or non-material-removing production methods that are suitable for separating sheet metal, for example punching, fine blanking, water jet cutting or electrical discharge machining, are suitable.

When use is made of metal sheets with a locally different sheet metal thickness, for example tailored blanks, the cut surfaces have correspondingly different depths along the contour profile of the adapter.

The second adapter advantageously comprises a flat second main body that extends largely perpendicularly to the pivot axis, the external contour of said second main body being formed sectionally by the peripheral lip. The peripheral lip can be at right angles to the main body or be connected thereto by a bending radius.

High rigidity of the second adapter is achieved in that the peripheral lip is oriented in an axial direction, that is to say parallel to the pivot axis of the backrest.

Preferably, the second stop extends in the direction of the pivot axis starting from the peripheral lip. The stop can be configured as a freestanding stop, but, in a preferred embodiment, is formed as a leg of a rooflike protuberance from the peripheral lip.

The second stop can have precisely one or more legs. A second leg can stabilize a first leg which has the second stop surface.

The second stop surface is preferably located on the sheet metal surface of the sheet metal material, i.e. not on a cut surface. As a result, the surface of the second stop surface can be larger than a cut surface, the surface area of which is limited in one direction by the sheet metal thickness of the sheet metal used. Compared with the known solutions from the prior art, in which two cut surfaces meet one another in an intersecting manner as stop surfaces, the contact surface can be increased and the surface pressure in the contact region reduced. In addition, a sufficiently large second stop surface allows tolerance compensation between the relative positions of the two stop surfaces.

The second stop can be produced with lower tolerances if said stop is surrounded at least partially by a cutout which is surrounded partially by an opening.

The second stop can be formed in a particularly rigid manner in that the second stop is formed in the manner of a corner blend. A first side of the corner blend can be the first leg. A second side of the corner blend can be the second leg. A third side of the corner blend can be a main body of the second adapter.

A pivot angle of the backrest that is limited in both pivoting directions is achieved in that the first adapter has precisely one first stop, the second adapter has precisely two second stops, and the first stop is arranged between the two second stops in the circumferential direction, that is to say in a direction equidistantly encircling the pivot axis.

An available installation space in the region between a cushion of the backrest and a cushion of the seat part can usually be used readily in that the first adapter is connected to the structure of the backrest and the second adapter is connected to the structure of the seat part. However, opposite attachment of the stops is possible, wherein the second adapter is connected to the structure of the backrest and the first adapter to the structure of the seat part.

The invention is explained in more detail in the following text with reference to an advantageous exemplary embodiment illustrated in the figures. However, the invention is not limited to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENTS

Figure 1:
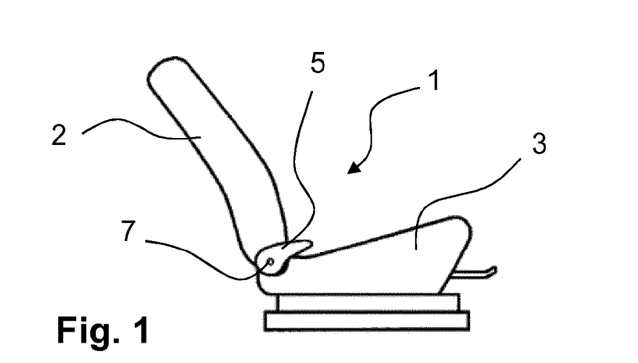
FIG. 1 is a schematic illustration of the vehicle seat according to the invention.

A vehicle seat 1 for a motor vehicle has a seat part 3 and a backrest 2, the inclination of which is settable relative to the seat part 3. The backrest 2 comprises a backrest structure and a cushion covering the backrest structure. The seat part 3 comprises a seat part structure and a cushion covering the seat part structure.

In order to set the inclination of the backrest 2, a transmission rod 7, which is arranged horizontally in the transition region between the seat part 3 and backrest 2, is rotated manually, for example by means of an operating lever 5. The transmission rod 7 engages in a fitting 10 on both sides of the vehicle seat 1.

Figure 2:
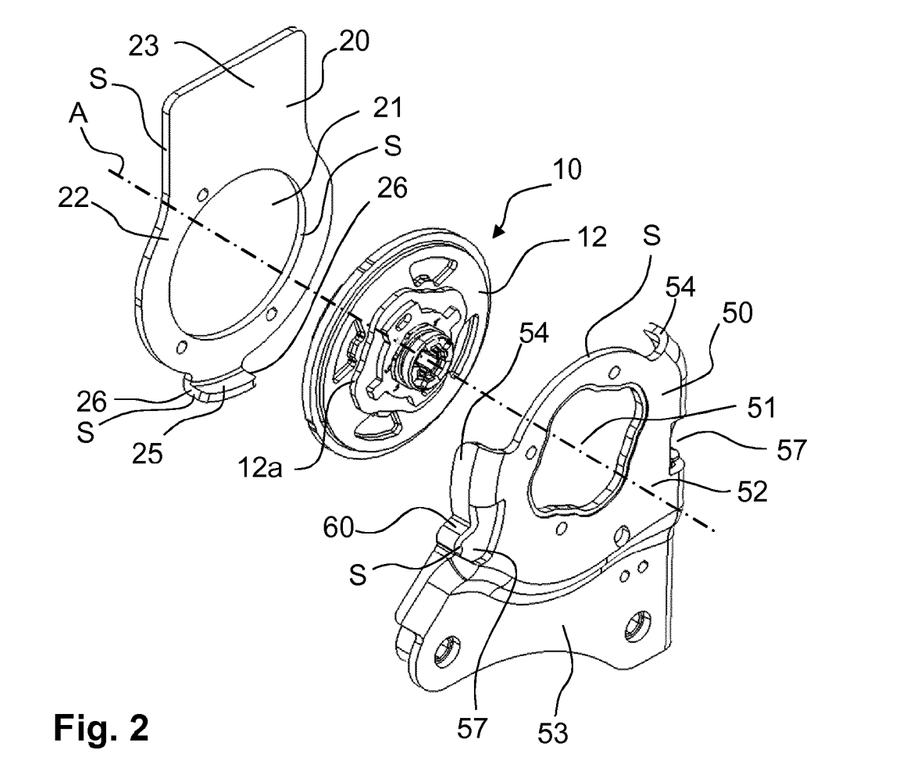
FIG. 2 is an exploded illustration of the arrangement of the fitting and the two adapters of the vehicle seat according to the invention.
Figure 3:
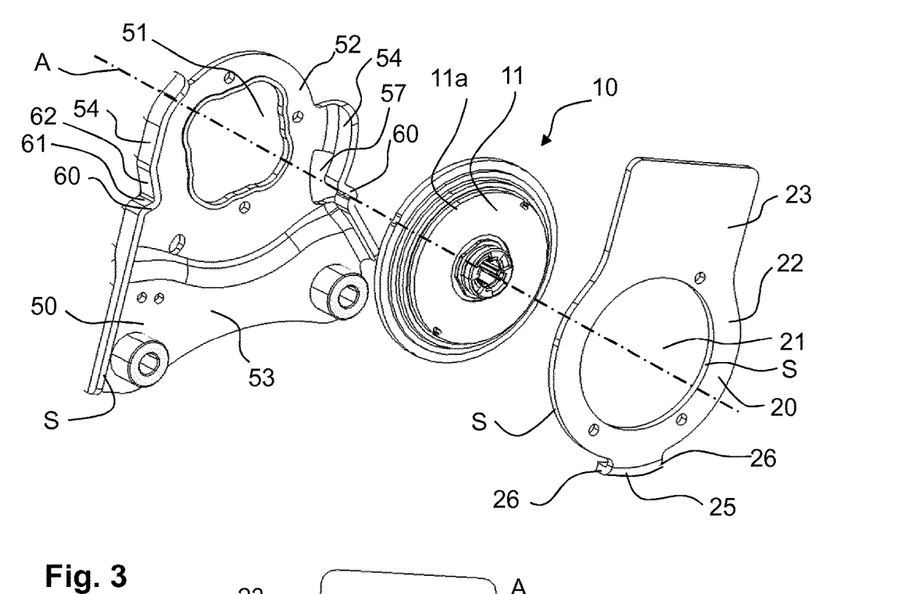
FIG. 3 is a further exploded illustration from an opposite viewing direction compared with FIG. 2.

The fitting 10 has a first fitting part 11 and a second fitting part 12 which are rotatable relative to one another and able to be locked together. The first fitting part 11 is connected firmly to the backrest structure of the backrest 2 by means of a first adapter 20. The second fitting part 12 is connected firmly to the seat part structure of the seat part 3, in the present case screwed thereto, by means of a second adapter 50. However, the assignments of the fitting parts 11 and 12 can also be exchanged, i.e. the first fitting part 11 would then be connected to the seat part structure and the second fitting part 12 to the backrest structure.

The fitting 10 is configured as a latching fitting, wherein the first fitting part 11 and the second fitting part 12 are able to be locked together and, after unlocking, are rotatable relative to one another about an axis A, as is described for example in WO 2012/072216. The axis A aligned with the transmission rod 7 defines the directional information used in a cylinder coordinate system.

The two fitting parts 11 and 12 can each be inscribed approximately in a circular disk shape. The two fitting parts 11 and 12, the first adapter 20 and the second adapter 50 consist of sheet steel in the present case. However, other materials and manufacturing processes, for example a die-casting process, could also be used.

In the present case, a circular annular shoulder 11 a, for example a material protuberance of the first fitting part 11, is formed on the first fitting part 11 on the end side thereof that is remote from the second fitting part 12. The annular shoulder 11a engages in a form-fitting manner through a circular first opening 21 in the first adapter 20, such that the first adapter 20 comes into abutment against the first fitting part 11 in that part of the end side of the first fitting part 11 that is arranged radially outside the annular shoulder 11a. Along the outer edge of the annular shoulder 11a, the first fitting part 11 is welded, in particular laser welded, in particular to a cutting face S, encircling the circular first opening 21, of the first adapter 20. The cut surfaces S should be understood as meaning those surfaces, formed by the sheet metal thickness, in the peripheral regions of the first adapter 20 and of the second adapter 50, which extend largely perpendicularly to the adjacent sheet metal surfaces.

In the present case, a star-shaped shoulder 12a is formed on the second fitting part 12 on the end side thereof that is remote from the first fitting part 11. The star-shaped shoulder 12a has a multi-arm, substantially symmetrical star shape, as is known for example from DE 10 2009 041 491 A1. The star-shaped shoulder 12a engages in a form-fitting manner in a second opening 51, formed in a complementary manner, in the second adapter 50, such that the second adapter 50 comes into abutment against the second fitting part 12 in that part of the end side of the second fitting part 12 that is arranged radially outside the star-shaped shoulder 12a. The second fitting part 12 is welded, in particular laser welded, to the second adapter 50 along the outer edge of the star-shaped shoulder 12a.

The first adapter 20 comprises a circular first main body 22 that is formed in a largely flat manner and is oriented perpendicularly to the axis A, the first opening 21 being introduced into said main body 22, and a first flange 23. The first main body 22 and the first flange 23 are formed integrally with one another and are located in one plane in the present case.

The first flange 23 is a rectangular region which is oriented toward the backrest 2 in the radial direction from the first main body 22 and which serves to attach the first adapter 20 to the structure of the backrest 2. Preferably, the first flange 23 is welded to the structure of the backrest 2 by means of a gas-shielded metal arc welding process.

A first stop 25 of the first adapter 20 protrudes from the first main body 22 in the axial direction, in the present case in the direction of the closest outer side of the vehicle seat 1. The first stop 25 is angled away from an outer region of the main body 22 which is located approximately opposite the first flange 23. The transition region between the first main body 22 and the first stop 25 is rounded in the present case, but may also be sharp-edged in a modification of the exemplary embodiment.

The first stop 25 has a rectangular shape that is curved about the axis A. Two cut surfaces S, oriented perpendicularly to a circumferential direction, of the first stop 25 each form a first stop surface 26. The two first stop surfaces 26 are each perpendicular to the planar extent of the first main body 22.

The second adapter 50 comprises an approximately circular second main body 52 that is formed in a largely flat manner and is oriented perpendicularly to the axis A, the second opening 51 being introduced into said second main body 52, and a second flange 53. The second main body 52 and the second flange 53 are formed integrally with one another and are located in a slightly offset manner with respect to one another in parallel planes.

The second flange 53 is oriented toward the seat part 3 in the radial direction from the second main body 52 and serves to attach the second adapter 50 to the structure of the seat part 3, the second adapter 50 being screwed thereto in the present case.

A peripheral lip 54 of the second adapter 50 extends sectionally along the outer contour of the second main body 52 and of the second flange 53, in the present case in the direction of the seat center. The peripheral lip 54 extends in the axial direction and thus perpendicularly to the planar second main body 52. The peripheral lip 54 is interrupted in the direction of the backrest 2 and in a region remote from the main body 52 of the second flange 53. The transition region between the second main body 52 and the peripheral lip 54 is rounded in the present case, but may also be sharp-edged in a modification of the exemplary embodiment. The same goes for the transition region between the second flange 53 and the peripheral lip 54.

The outer contour of the second main body 52 and thus the peripheral lip 54 extend approximately in the form of a circular arc with a radius R about the axis A in two portions that are located opposite one another relative to the axis A. A second stop 60 protrudes from each of these two portions of the peripheral lip 54, said second stop 60 extending from the peripheral lip 54 in the direction of the axis A and serving in each case to interact with the first stop 25. The two second stops 60 are comparable to one another in terms of their structure and function, and so only one second stop 60 is described in the following text.

The second stop 60 protrudes from a subregion of the peripheral lip 54. The rounding between the peripheral lip 54 and the second main body 52 is removed by a cutout 57 at this location. The cutout 57 thus forms an opening in the rounded transition region between the peripheral lip 54 and the second main body 52, and so the peripheral lip 54 is not connected directly to the second main body 52 along the cutout 57. The peripheral lip 54 is curved inwardly in the radial direction along the cutout 57, in the manner of two legs 61, 62 of a triangle. A first leg 61 is oriented toward the axis A in the radial direction and forms the second stop 60. The other of the two legs 61, 62, a second leg 62, stabilizes the first leg 61, that is to say the second stop 60. The transition region between the first leg 61 and the second leg 62 is rounded in the present case, but may also be sharp-edged in a modification of the exemplary embodiment.

A second stop surface 66, oriented perpendicularly to the circumferential direction, of the second stop 60 is perpendicular to the adjacent cut surfaces S which delimit the width of the second stop 60. The second stop surface 66 is thus located on the sheet metal surface. The second stop surface 66 is perpendicular to the planar extent of the second main body 52.

Figure 4:
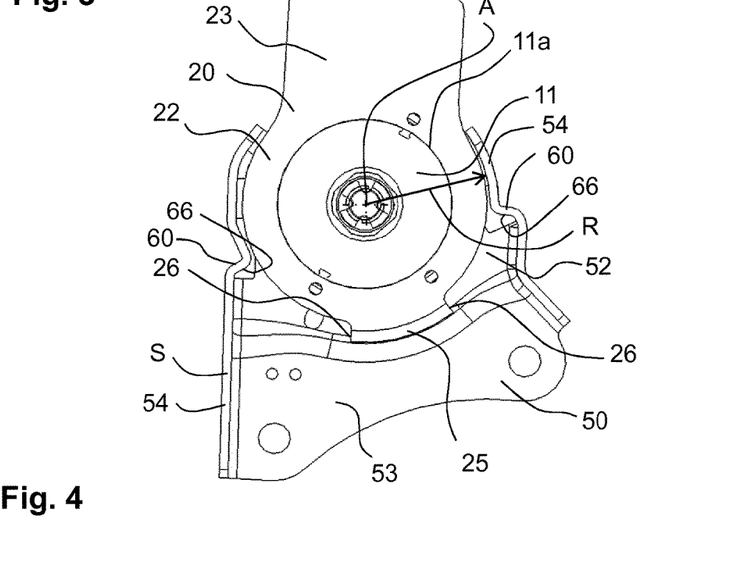
FIG. 4 is a side view of the fitting and the two adapters of the vehicle seat according to the invention in an intermediate position of the backrest.

The first stop 25—as seen in the circumferential direction about the axis A—is arranged between the two second stops 60. Each of the two first stop surfaces 26 of the first stop 25 is oriented in the direction of one of the two second stop surfaces 66 of the second stop 60. The distance of the first stop surfaces 26 from the axis A in the radial direction and the distance of the second stop surfaces 66 from the axis A in the radial direction are similar, but the mutually assigned first and second stop surfaces 26, 66 overlap in the radial direction, such that they bear against one another after a particular pivot angle when the backrest 2 is pivoted, and as a result limit the pivot angle of the backrest 2 in both pivoting directions in the manner described in more detail in the following text.

FIG. 4 illustrates an intermediate position of the backrest 2. The angular position of the first flange 23 corresponds to the angular position of the backrest 2. The first stop 25 is spaced apart from the two second stops 60 in the circumferential direction, such that neither of the two first stop surfaces 26 is in contact with a second stop surface 66.

Figure 5:
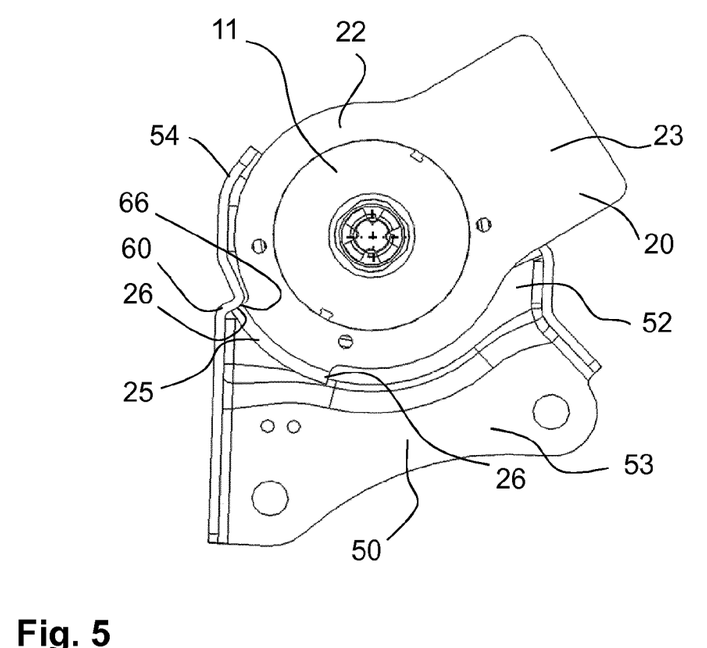
FIG. 5 is a view corresponding to FIG. 4 in a first stop position of the backrest.
Figure 6:
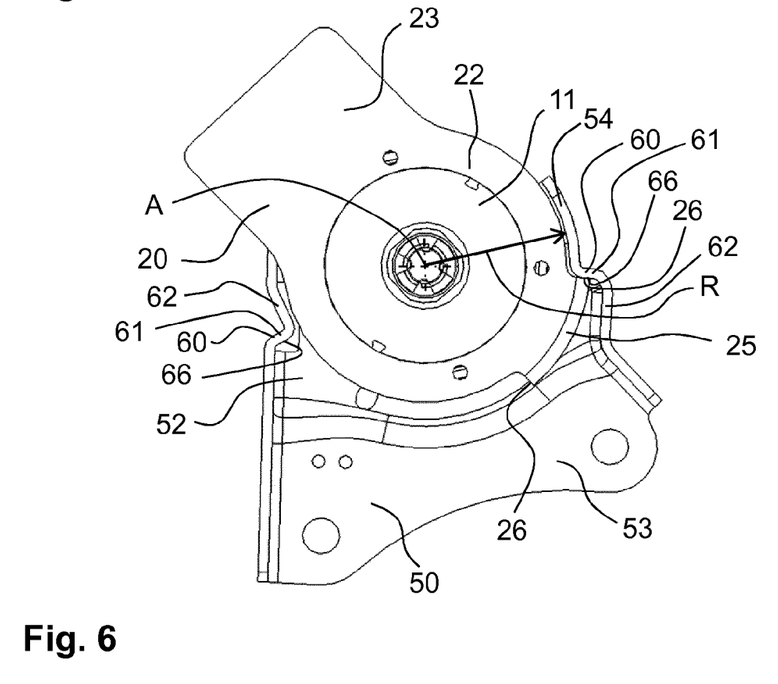
FIG. 6 is a view corresponding to FIG. 4 in a second stop position of the backrest.
Figure 7:
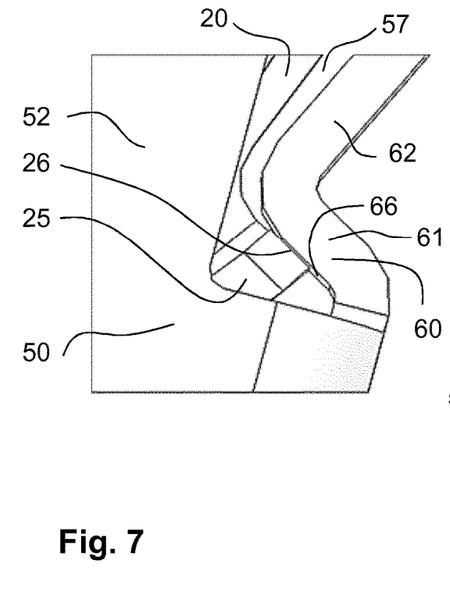
FIG. 7 is a detail view of the second stop illustrated on the left in FIG. 4 from an opposite viewing direction compared with FIG. 4.
Figure 8:
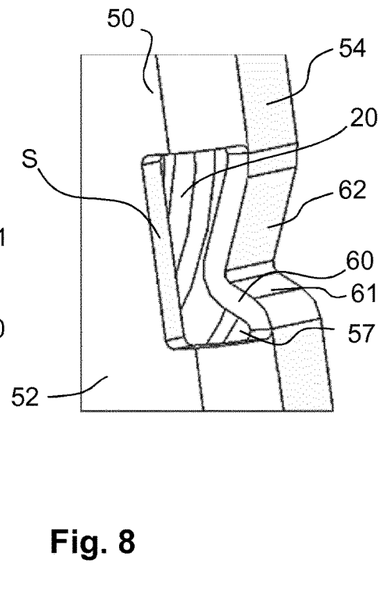
FIG. 8 is a further detail view of the second stop illustrated on the left in FIG. 4 from an opposite viewing direction compared with FIG. 4.
Figure 9:
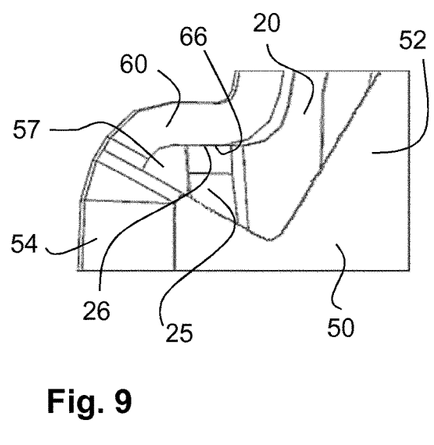
FIG. 9 is a detail view of the second stop illustrated on the right in FIG. 4 from an opposite viewing direction compared with FIG. 4.
Figure 10:
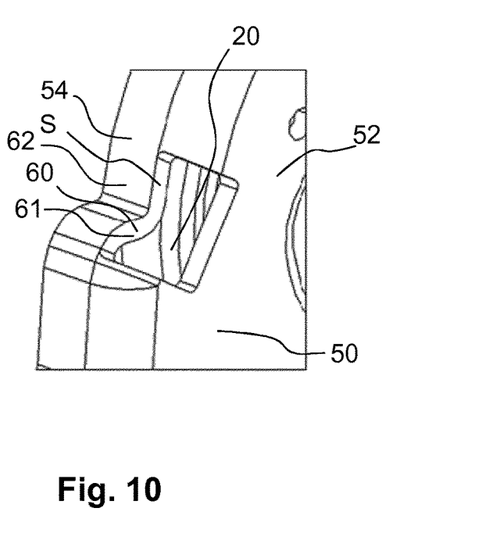
FIG. 10 is a further detail view of the second stop illustrated on the right in FIG. 4 from an opposite viewing direction compared with FIG. 4.

FIGS. 5 and 6 each show one of the two stop positions. In each of the two stop positions, one of the two first stop surfaces 26 is in contact with one of the two second stop surfaces 66, such that the backrest 2 cannot be pivoted further in the respective direction.

In a first modification of the exemplary embodiment, the first adapter is integrated into the backrest structure of the backrest and/or the second adapter is integrated into the seat part structure of the seat part.

In a second modification of the exemplary embodiment, the first adapter is integrated into the first fitting part and/or the second adapter is integrated into the second fitting part.

In a third modification of the exemplary embodiment, the second stop protrudes from the peripheral lip in a region of the second adapter that does not have a cutout. The invention is expressly not limited to exemplary embodiments with a cutout. For example, the two stops can then be formed in the manner of a corner blend, or the leg that forms the second stop runs continuously into the second main body.

In a further modification of the exemplary embodiment, the fitting is configured as a geared fitting as is known for example from DE 10 2011 012 076 A1.

The features disclosed in the above description, the claims and the drawings may be of importance both individually and in combination in order to realize the invention in the various configurations thereof. While specific embodiments of the invention have been shown and described in detail to illustrate the application of the principles of the invention, it will be understood that the invention may be embodied otherwise without departing from such principles.

The invention claimed is:

1. A vehicle seat comprising:
    a seat part;
    a backrest;
    at least one fitting, the backrest being connected to the seat part by the at least one fitting which comprises a first fitting part and a second fitting part that is rotatable about an axis relative to the first fitting part, said backrest also being pivotable about the axis relative to the seat part;
    a first adapter which connects the first fitting part firmly to a structure of the backrest or to a structure of the seat part;
    a second adapter which connects the second fitting part firmly to the other of the two structures of the seat part and of the backrest, the second adaptor having a peripheral lip that protrudes in an axial direction from a peripheral edge of the second adapter;
    at least one first stop on the first adapter; and
    at least one second stop on the second adapter, wherein the first stop limits the pivot angle of the backrest by interacting with the second stop, and the second stop is formed in one piece with the second adapter, and the second stop protrudes from the peripheral lip of the second adapter, wherein the second stop comprises a first leg which extends toward the axis in a radial direction starting from the peripheral lip and a second leg which extends toward the axis in the radial direction starting from the peripheral lip, is connected to and stabilizes the first leg.

2. The vehicle seat as claimed in claim 1, wherein the first stop has a first stop surface, the second stop has a second stop surface (66), and when the backrest is pivoted, after passing through a pivot angle, the first stop surface bears against the second stop surface and as a result limits the pivot angle of the backrest.

3. The vehicle seat as claimed in claim 1, wherein the first adapter has a flat first main body extending mostly perpendicularly to the axis, the first stop protruding from said first main body in an axial direction.

4. The vehicle seat as claimed in claim 1, wherein the first stop is formed integrally with the first adapter.

5. The vehicle seat as claimed in claim 2, wherein the first adapter is produced from a sheet metal material and the first stop surface is formed from a cut surface of the sheet metal material.

6. The vehicle seat as claimed in claim 1, wherein the second adapter has a second main body that extends mostly perpendicularly to the axis, an external contour of said second main body being formed sectionally by the peripheral lip.

7. The vehicle seat as claimed in claim 1, wherein the peripheral lip is oriented in an axial direction, parallel to the axis.

8. The vehicle seat as claimed in claim 1, wherein the first leg and the second leg are formed in a shape corresponding to two legs of a triangle.

9. The vehicle seat as claimed in claim 2, wherein the second adapter is produced from a sheet metal material and a part of a sheet metal surface of the sheet metal material forms the second stop surface.

10. The vehicle seat as claimed in claim 9, wherein the second adapter has two sheet metal surfaces, including the sheet metal surface, wherein the two sheet metal surfaces are spaced apart from one another at the spacing of a sheet metal thickness.

11. The vehicle seat as claimed in claim 9, wherein the second stop is surrounded at least partially by a cutout (57).

12. The vehicle seat as claimed in claim 9, wherein the second stop is formed in the manner of a corner blend.

13. The vehicle seat as claimed in claim 9, wherein the second stop surface is bounded by at least one cut surface in an axial direction.

14. The vehicle seat as claimed in claim 1, wherein the first adapter has precisely one first stop, the second adapter has precisely two second stops, and the first stop is arranged between the two second stops in a circumferential direction around the axis and limits the pivot angle of the backrest in both pivoting directions.

\* \* \* \* \*